US009481158B2

(12) United States Patent
Horst et al.

(10) Patent No.: US 9,481,158 B2
(45) Date of Patent: Nov. 1, 2016

(54) SHORT COURSE FIBER PLACEMENT HEAD (71) Applicant: The Boeing Company, Chicago, IL (US)

(72) Inventors: Perry T Horst, Tacoma, WA (US); Brice A Johnson, Federal Way, WA (US)

(73) Assignee: THE BOEING COMPANY, Chicago, IL (US)

(*) Notice: Subject to any disclaimer, the term of this patent is extended or adjusted under 35 U.S.C. 154(b) by 546 days.

(21) Appl. No.: 13/939,483

(22) Filed: Jul. 11, 2013

(65) Prior Publication Data
US 2015/0013892 A1 Jan. 15, 2015

(51) Int. Cl.
B32B 38/00 (2006.01)
B29C 70/38 (2006.01)
B29C 70/54 (2006.01)

(52) U.S. Cl.
CPC ......... *B32B 38/0004* (2013.01); *B29C 70/384* (2013.01); *B29C 70/545* (2013.01); *Y02T 50/433* (2013.01); *Y10T 156/1052* (2015.01); *Y10T 156/125* (2015.01)

(58) Field of Classification Search
CPC .............. B29C 70/545; B29C 70/384; B32B 38/0004; Y10T 156/1052; Y10T 156/125
See application file for complete search history.

(56) References Cited

U.S. PATENT DOCUMENTS

| 4,351,688 | A | * | 9/1982 | Weiss | ................ | B26D 5/04 |
| | | | | | | 156/358 |
| 5,979,531 | A | * | 11/1999 | Barr | .................. | B29C 70/384 |
| | | | | | | 156/351 |
| 7,867,352 | B2 | | 1/2011 | Johnson et al. | | |
| 8,038,099 | B2 | | 10/2011 | Anast et al. | | |
| 9,193,140 | B2 | * | 11/2015 | Johnson | ............. | B32B 38/0004 |
| 2006/0118244 | A1 | | 6/2006 | Zaballos et al. | | |
| 2008/0156436 | A1 | | 7/2008 | Johnson et al. | | |
| 2009/0211698 | A1 | | 8/2009 | McCowin | | |
| 2010/0230043 | A1 | | 9/2010 | Kisch | | |
| 2011/0073238 | A1 | | 3/2011 | Johnson et al. | | |

(Continued)

FOREIGN PATENT DOCUMENTS

| EP | 0370507 | 5/1990 |
| EP | 2574448 | 4/2013 |

OTHER PUBLICATIONS

Canadian Intellectual Property Office; Office Action for Application No. 2,853,845 dated Aug. 10, 2015.

(Continued)

*Primary Examiner* — Mark A Osele
*Assistant Examiner* — Christopher C Caillouet
(74) *Attorney, Agent, or Firm* — Parsons Behle & Latimer (57) ABSTRACT A composite automation method and apparatus for the generation of short path course application of a composite lamina is realized by reconfiguring the functional mechanisms of the fiber placement head. Separating the fiber advance and retract functions, nesting the activation cylinders, and making use of push only activation results in a simplified, compact AFP delivery head. Uniform cutting is provided by a circular configuration fiber cutting blade, were at activation the blade both provides a progressive cutting force and rotates to providing a new cutting edge, and requires limited cutting edge guidance as all orientations cut equally well. The mechanism nested in functions and placed in close proximity to the compaction roller reduces the overall fiber course to the application point.

20 Claims, 7 Drawing Sheets (56) References Cited

U.S. PATENT DOCUMENTS

2012/0152432 A1 6/2012 Pedigo et al.
2012/0258276 A1 10/2012 Modin
2013/0074663 A1 3/2013 Pedigo et al.

OTHER PUBLICATIONS

European Patent Office; Extended European Search Report for Application No. 14174924.2 dated Nov. 18, 2014.

* cited by examiner

SHORT COURSE FIBER PLACEMENT HEAD

BACKGROUND

This application generally relates to automated methods and equipment for laying up plies of composite material, and deals more particularly with a method and apparatus for placing short courses of composite tape on a substrate during the layup process.

Composite structures such as those used in the automotive, marine and aerospace industries may be fabricated using automated composite material application machines, commonly referred to as automated fiber placement (AFP) machines. AFP machines may be used in the aircraft industry, for example, to fabricate structural components and skins by placing relatively narrow strips of composite, slit fiber tape or "tows" on a manufacturing tool. The tape may be placed on the tool in parallel courses that may be in substantially edge-to-edge contact to form a ply.

Known AFP machines employ a tape placement head that dispenses, cuts and compacts courses of tape onto the tool surface as a tape placement head is moved by a robotic device over the tool surface. These tape placement heads typically include a supply spool of tape, and a dispensing mechanism that draws the tape from the spool and guides the tape into a nip between a compaction roller and the tool surface. A cutter blade within the dispensing mechanism located upstream from the compaction roller cuts the tape to a desired course length. The minimum length of a tape course that can be placed by the tape placement head may therefore be governed by the distance between the point where the tape is compacted onto the tool surface and the point where the tape is cut by the blade.

In some applications, relatively short courses may be required which have a length less than the minimum course length that can be cut by known tape heads. In other words, a desired course length may be less than the distance from the compaction point to the point where the cut is made. Under these circumstances, it may be necessary to place courses that are longer than optimum course lengths, thereby adding weight and/or cost to the part, or prompting the need to trim the plies of excess tape, or to manually lay the short courses by hand, thereby adding undesired labor and expense to the manufacturing process.

SUMMARY

Accordingly, there is a need for a tape placement head and method for cutting courses of tape which allow placement of courses of shorter length.

The present application discloses various systems and methods to address the aforementioned challenges with existing tape heads.

In one example, an automated fiber placement (AFP) machine is disclosed for placing composite material on a substrate. The AFP machine comprises a first low-profile tow control module comprising one or more circular cutter blades, and a second low-profile tow control module comprising one or more circular cutter blades. The AFP machine further comprises a vee block coupled to the first and second low-profile tow control modules and located between the first and second low-profile tow control modules, the vee block comprising a plurality of air passages located therein. The AFP machine further comprises a plurality of air cylinders coupled to the vee block and nested between the first low-profile tow control module and the second low-profile tow control module, the plurality of air cylinders being aligned with the air passages located within the vee block.

The first and second low-profile tow control modules may have a height no greater than about ¾ inch. The circular cutter blades may have a height no greater than about ¾ inch. The AFP machine may further comprise a compaction roller having a diameter no greater than about ¾ inch. The circular cutter blades may be removably coupled to a cutter rocker arm configured to be rotated about an axle by a first, cutter extend piston and second, cutter retract piston. The substrate may comprise a flat or nearly-flat charge. The AFP machine may further comprise a control unit configured to access a file that includes computer readable instructions for fabricating a composite item. The AFP machine may further comprise one or more positioning devices configured to maneuver the substrate relative to a delivery head while the composite material is placed on the substrate. The positioning device(s) may comprise one or more NC machines, robotic arms, or mandrels.

In another example, a delivery head of an automated fiber placement (AFP) machine comprises a vee block having a plurality of air passages located therein, and a first tow control module coupled to the vee block. The first tow control module comprises a tow guide tray, a support frame, a cutter rocker arm with an attached cutter blade, and a pinch/feed rocker with an attached pinch roller. The cutter rocker arm is coupled to the support frame by a cutter rocker axle. The pinch/feed rocker is nested within the cutter rocker arm and is coupled to the support frame by a pinch/feed rocker axle. A plurality of pistons are positioned in cavities located within the vee block and coupled to the air passages, the pistons being aligned with the cutter rocker arm and the pinch/feed rocker.

The attached cutter blade may comprise a circular cutter blade. The pistons may comprise a first, cutter extend piston and second, cutter retract piston, which are configured to rotate the cutter rocker arm about the cutter rocker axle. The tow guide tray may define a plurality of tow guide paths, and the first tow control module may comprise a corresponding plurality of cutter rocker arms and pinch/feed rockers. The delivery head may be configured to place composite material on a flat or nearly-flat charge. The delivery head may further comprise a second tow control module coupled to the vee block, the second tow control module comprising substantially identical components as the first tow control module, located in complementary positions.

In another example, a method of placing a course of composite material on a substrate is disclosed using an AFP machine with a low-profile delivery head and a circular cutter blade. The method comprises feeding one or more tows of composite material through the delivery head by extending a feed piston to bring a pinch roller into contact with a feed roller, thereby causing the tow(s) of composite material to be pulled between the pinch roller and the feed roller along a tow guide channel. The method further comprises cutting the tow(s) of composite material to a desired length by extending a cutter extend piston and retracting a cutter retract piston, thereby causing a cutter rocker arm to rotate about an axis and lower the circular cutter blade through the tow guide channel. The method further comprises retracting the circular cutter blade by extending a cutter retract piston and retracting a cutter extend piston, thereby causing a cutter rocker arm to rotate about an axis and raise the circular cutter blade out of the tow guide channel.

The method may further comprise rotating the circular cutter blade to provide a new cutting edge. The method may further comprise clamping the tow(s) of composite material in place in the tow guide channel by extending a clamp piston at substantially the same time as the circular cutting blade is lowered. Extending the pistons may comprise supplying air pressure to the pistons through passages formed within a vee block. The substrate may comprise a flat or nearly-flat charge.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that various changes may be made without departing from the spirit and scope of the present disclosure. The following detailed description is, therefore, not to be taken in a limiting sense.

The present application discloses a system for placing composite lamina plies to fabricate a composite item and a method of using this system. Specifically, the system provides for the short path course application of a composite lamina by reconfiguring the functional mechanisms of a fiber placement head. In some examples, the system includes an automated lamination device such as, for example, an automated fiber placement (AFP) machine. This lamination device includes one or more dispensing heads to place plies of composite material upon a mandrel, layup mold or tool. In addition, the lamination device includes a cutting device to cut the composite material. Additional details and variations regarding the configuration and operation of the system will be apparent to those of ordinary skill in the art, having the benefit of this disclosure.

Figure 1:
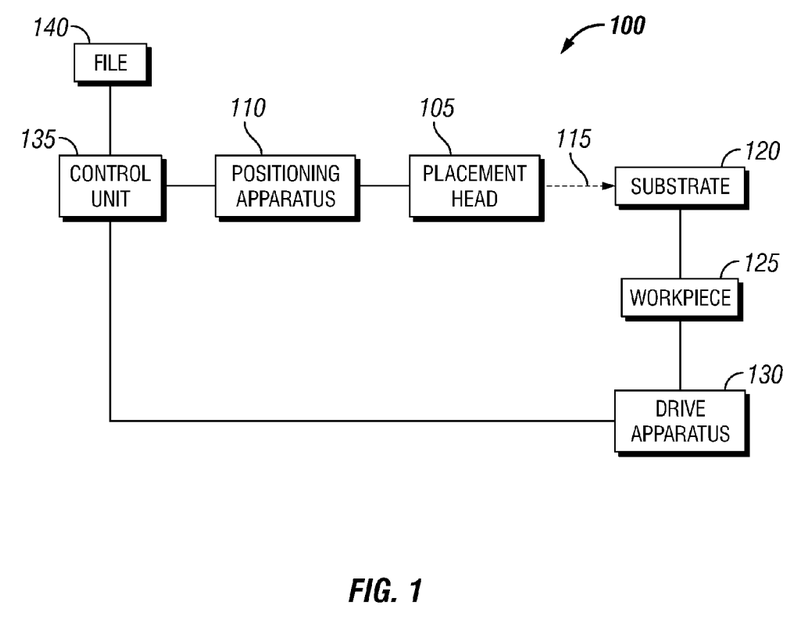
FIG. 1 is a block diagram of one example of an automated fiber placement (AFP) machine in accordance with the present application.

FIG. 1 is a block diagram of one example of an automated fiber placement (AFP) machine 100 in accordance with the present application. In the example shown in FIG. 1, the AFP machine 100 includes a placement head 105 that is positioned by a corresponding positioning device 110. The placement head 105 is configured to place 115 composite material upon a substrate 120. The substrate 120 includes the surface of a workpiece 125, such as, for example, a mandrel, tool, layup model, or any other suitable surface on which composite material is placed. In addition, the substrate 120 may include any previously applied composite material, tackifier, and the like that is previously laid down on the workpiece 125. The workpiece 125 is rotated or otherwise positioned by a drive apparatus 130. The drive apparatus 130 and/or the positioning device 110 are controlled by a control unit 135. The control unit 135 accesses a file 140 that includes computer readable instructions for fabricating a composite item.

Figure 2A:
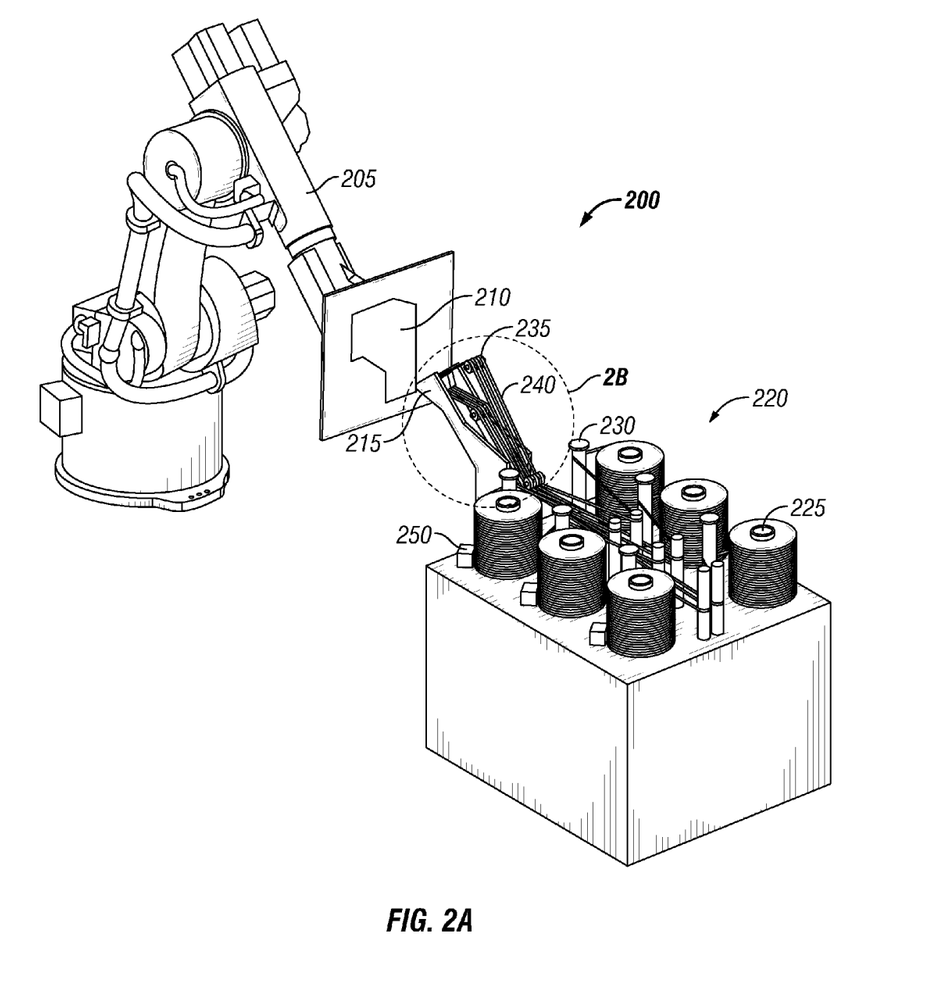
FIGS. 2A and 2B are schematic diagrams illustrating one example of an AFP machine in accordance with the present application.

FIG. 2A is a schematic diagram illustrating one example of an automated fiber placement (AFP) machine 200 in accordance with the present application. In general, the AFP machine 200 is configured to maneuver a substrate 210, such as a tool or a flat charge layup mold, relative to a fiber placement head assembly, or delivery head 215, while tows of composite material are placed on the substrate 210. For instance, in the specific example illustrated in FIG. 2A, the AFP machine 200 comprises a numerical control (NC) machine 205, such as a robotic arm, which is configured to manipulate the substrate 210 while the delivery head 215 remains stationary. In other cases, the AFP machine 200 may comprise an NC machine 205 that is configured to move the delivery head 215 while the substrate 210 either remains fixed or moves in one or more additional axes of motion. Beyond these examples, other alternative mechanisms may be utilized for moving the substrate 210 relative to the delivery head 215, as will be appreciated by those of ordinary skill in the art.

Figure 2B:
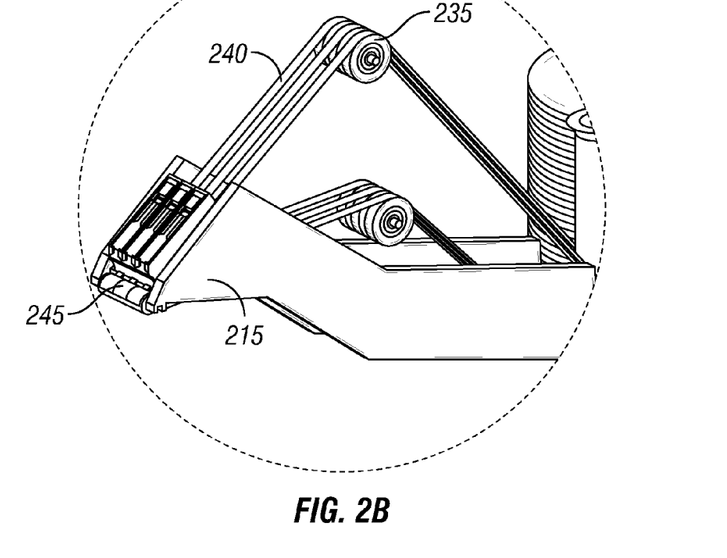

The delivery head 215 is shown in greater detail in FIG. 2B. The AFP machine 200 further comprises a tow supply system 220 including a set of storage spools 225, or creels, as well as a series of tow guides, e.g., redirect rollers 230 and redirect pulleys 235, as well as a tension brake system 250. For simplicity, the complete roller support framework for the AFP machine 200 is not shown in its entirety in FIGS. 2A and 2B. The AFP machine 200 may also comprise various standard control components, such as pneumatic cylinders, electro-servo actuators, control wires, hoses, etc. (not shown) that control the operation of the AFP machine 200 under the direction of a suitable control module, such as the control unit 135 shown in FIG. 1.

In operation, the AFP machine 200 pulls tows 240 of a composite material, such as carbon fiber-epoxy, from the storage spools 225 around redirect rollers 230, which function to maintain a predetermined tension onto the each fiber or tow 240, and through redirect pulleys 235 to the delivery head 215. Each tow 240, in turn, is cut to the correct length by a cutting blade in response to a command from a control unit 135, as the material course, also called a tow band, is laid over the substrate 210. Each tow 240 has a corresponding cutting blade, however the number of blades may vary depending upon the number of tows 240 and the width of each tow 240. As the tows 240 emerge from the delivery head 215, they pass over a compaction roller 245 which applies and compresses the tows 240 onto the surface of the substrate 210 as it moves relative to the delivery head 215. Heat may be applied to the tows 240 immediately before they are placed on the substrate 210 in order to increase the surface tackiness of the resin impregnated tow. Tension can be maintained on the tows 210 to assist in pulling them through the AFP machine 200 as sensed by redirect rollers 230 controlling the tension brake system 250.

Figure 3:
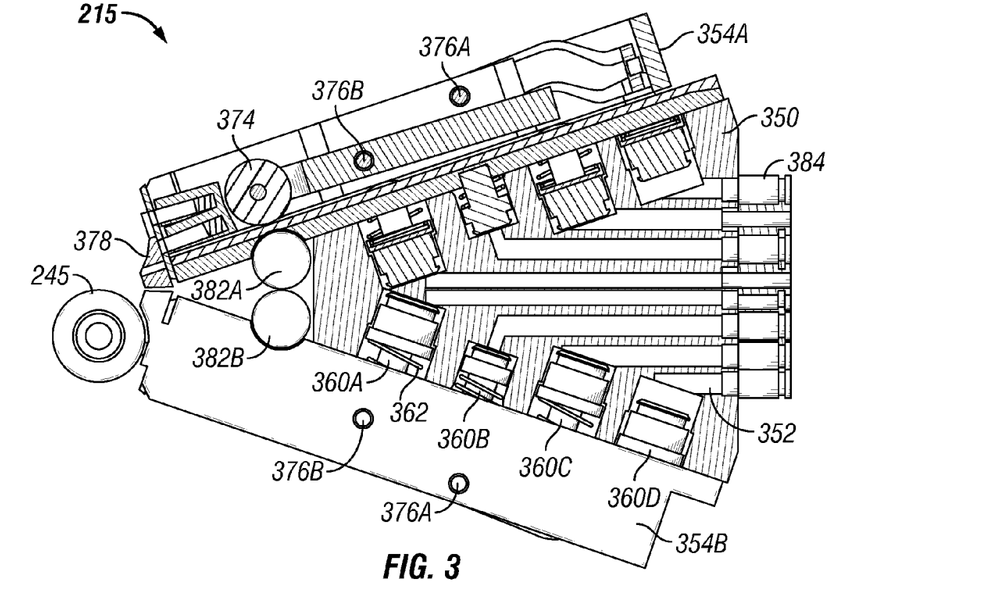
FIG. 3 illustrates a partial cross-sectional view of one example of a delivery head for an AFP machine.
Figure 4:
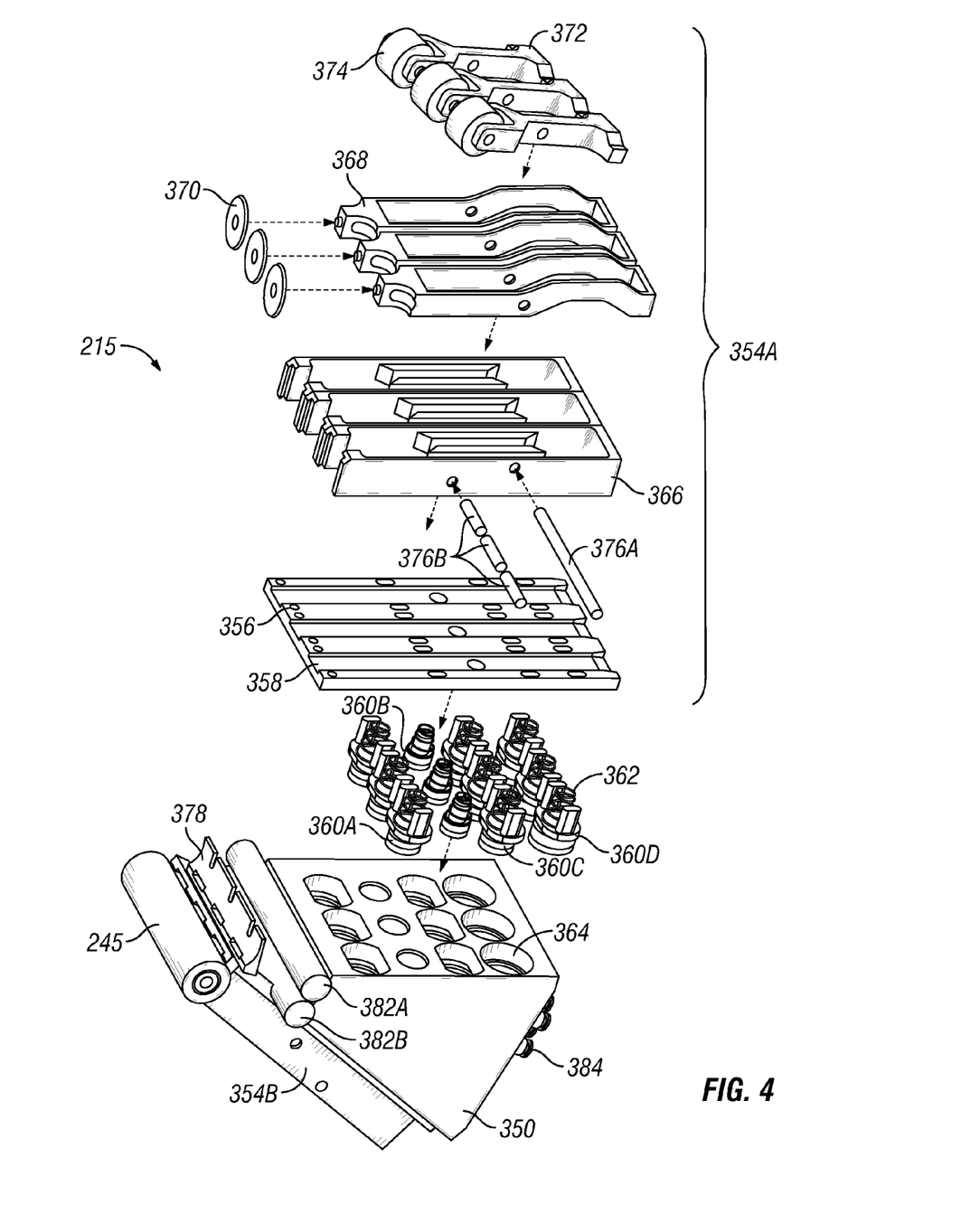
FIG. 4 illustrates an exploded view of one example of a delivery head for an AFP machine.

FIGS. 3 and 4 illustrate a partial cross-sectional view and an exploded view, respectively, of one example of a delivery head 215. In the example shown in FIGS. 3 and 4, the delivery head 215 comprises a "vee block" 350 having a plurality of air fittings 384 coupled to passages 352 located within the vee block 350, through which air pressure can be ducted during operation. The air fittings 384 are compatible with conventional pneumatic valves configured to control the operation of the delivery head 215 per predetermined instructions from the control unit 135. The delivery head 215 is comprised of a first, upper tow control module 354A and a second, lower tow control module 354B, which contain substantially identical components located in complementary positions. The tow control modules 354A, 354B guide the tows 240 through the delivery head 215 during operation, as described above. For simplicity, only the components of the upper tow control module 354A are separated in the exploded view of FIG. 4.

Each tow control module 354 comprises a tow guide tray 356 coupled to the vee block 350, which establishes the configuration of the tow feed path as set by the tow channel dimensions 358 within the tow guide tray 356. The total bandwidth output is defined by a plurality of tow guide channels 358 corresponding to the number of tows 240 for which the delivery head 215 is designed. For example, in the specific case illustrated in FIGS. 3 and 4, both the upper tow control module 354A and the lower tow control module 354B include a tow guide tray 356 having three tow guide channels 358 each, meaning that the delivery head 215 is configured to place up to six tows 240 of composite material (three tows 240 from the upper tow control module 354A and three tows 240 from the lower tow control module 354B) simultaneously on the substrate 210 during each course in an aligned edge on edge pattern.

The delivery head 215 further comprises a plurality of pushrod/piston subassemblies 360, corresponding to the selected number of tow guide channels 358. Each pushrod/piston subassembly 360 comprises a first, cutter retract piston 360A, a second, clamp piston 360B, a third, feed piston 360C, and a fourth, cutter extend piston 360D. In the illustrated example, the cutter retract piston 360A, clamp piston 360B, feed piston 360C, and cutter extend piston 360D all include bias springs 362. Each pushrod/piston subassembly 360 is located in a series of cavities 364 in the vee block 350, which are aligned with a corresponding tow guide channel 358.

Each tow control module 354 also comprises a support frame 366 coupled to the tow guide tray 356, as well as a cutter rocker arm 368 with an attached cutter blade 370 and a pinch/feed rocker 372 with an attached pinch roller 374 for each tow guide channel 358. Each cutter rocker arm 368 is coupled to the support frame 366 by a first, cutter rocker axle 376A, on which the cutter rocker arm 368 pivots during operation. Similarly, each pinch/feed rocker 372 is coupled to the support frame 366 by a second, pinch/feed rocker axle 376B, on which the pinch/feed rocker 372 pivots during operation. Although the first, cutter rocker axle 376A is illustrated as a single, unitary member for all three cutter rocker arms 368 shown in FIG. 4, in some cases, the first, cutter rocker axle 376A may be subdivided into multiple members, each one corresponding to an individual cutter rocker arm 368. Each tow control module 354 also comprises one or more blade covers 378 coupled to the support frame 366, which are configured to cover the cutter blades 370 during operation.

The cutter rocker arms 368 and pinch/feed rockers 372 of the delivery head 215 are substantially symmetric, which may advantageously reduce twist and binding distortions in some instances. Each pinch/feed rocker 372 nests in a pocket of a corresponding cutter rocker arm 368, except near the back end, where tabs extend for engagement by a feed piston 360C. At the locations of the tabs in each pinch/feed rocker 372, the corresponding cutter rocker arm 368 steps up to allow adequate rotation of the pinch/feed rocker 372. Each cutter rocker axle 376A is located high enough to allow the corresponding pinch/feed rocker 372 to rotate, and the tow control module 354 is preferably designed to substantially minimize the amount of overall rotation required.

The delivery head 215 further comprises a compaction roller 245 coupled to the vee block 350 configured to contact the substrate 210 where the vee block 350 forms a nip point at the intersection of the vee pattern fiber feed to a contact intersection point under the compaction roller 245. In addition, the delivery head 215 comprises a first, upper feed roller 382A and a second, lower feed roller 382B coupled to one or more suitable drive mechanisms, such as a servo actuator. The feed rollers 382A, 382B form a nip compaction pull force when pinch roller 374 is activated by pistion 360C acting on pinch/feed rocker 372 to contact feed roller 382. The force acts to pull the tows 240 of composite material through the upper and lower tow control modules 354A, 354B, respectively, at a desired speed and for a desired time duration, under the direction of a suitable control module, such as the control unit 135 shown in FIG. 1.

Unlike conventional AFP delivery heads, the delivery head 215 of the present application includes various distinctive features that optimize the delivery head 215 for short courses and flat or nearly-flat charges. For example, the total distance from the tow drop off or cutting point to the roller nip area is reduced by compaction roller 245, which is substantially smaller in diameter than a conventional compaction roller, and additionally by the compact design of the tow cut add mechanism which places the cut off point to the nip point closer. Specifically, in some cases, the compaction roller 245 has a diameter of no more than about ¾ inch.

In addition, the delivery head 215 includes cutter blades 370 with a unique circular cutter geometry, rather than the traditional rectangular shape utilized in conventional cutter blades. The circular cutter blade design advantageously allows the delivery head 215 to utilize cutter blades 370 that are substantially shorter than conventional AFP cutters. Specifically, in some cases, the cutter blades 370 have a maximum length of no more than about ¾ inch. The circular cutter blade design also advantageously eliminates the need for blade guides, because the cutter blades 370 can cut equally well in every orientation. Additionally cutter life is extended by cutter rotation during use about the center cutter mounting point. The circular cutter blades 370 are also easily accessible, removable, and replaceable.

In conventional AFP machines, the pneumatic conduits and other equipment used to actuate the pushrods and pistons are typically coupled to the exterior of the tow control modules and the vee block. As a result, conventional AFP delivery heads can be bulky and cumbersome, making it difficult fabricate small composite parts with short course lengths. The delivery head 215 of the present application, by contrast, employs a unique design in which the air fittings 384 are nested between the upper and lower tow control modules 354A, 354B, and air pressure is ducted through passages 352 located within the vee block 350 to control the operation of the pushrod/piston subassemblies 360. This compact configuration advantageously enables the delivery head 215 to utilize a low-profile design for the tow control modules 354. Specifically, in some cases, the tow control modules 354 have a maximum height of no more than about ¾ inch.

FIGS. 5A through 5D illustrate the positions of a pushrod/piston subassembly 360A-360D during various operational stages of the AFP process. In general, the pistons 360A-360D are spring biased in a retracted position, and can be extended by supplying air pressure to the desired cylinder bore cavities 364 of the associated activation pistons 360A-360D through the corresponding air fittings 384 and passages 352. This can be accomplished with various control valves and other control equipment (not shown) using conventional techniques and control methods processed within control unit 135 that are well-known to those of ordinary skill in the art.

Figure 5A:
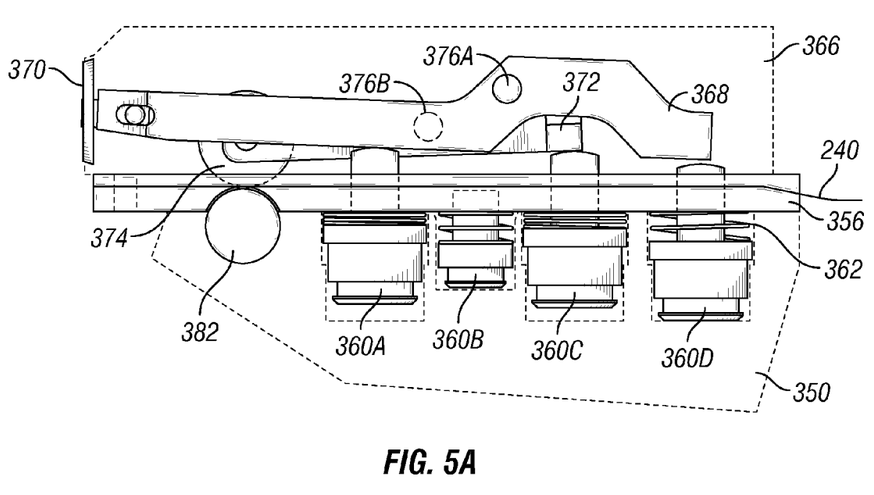
FIGS. 5A through 5D illustrate the positions of a pushrod/piston subassembly during various stages of the AFP process.

FIG. 5A illustrates the "tow feed" stage of the AFP process, during which a tow 240 of composite material is pulled through the delivery head 215 by the feed roller 382. During this tow feed stage, as shown in FIG. 5A, the cutter retract piston 360A is extended and the cutter extend piston 360D is retracted, to prevent the front end of the cutter rocker arm 368 from lowering to engage the cutter blade 370. In addition, the feed piston 360C is extended, which lowers the front end of the pinch/feed rocker 372 and brings the pinch roller 374 into contact with the feed roller 382 in contact with pinch roller 374 as activated by feed piston 360C. The clamp piston 360B is retracted to ensure that the tow 240 of composite material can be pulled through the corresponding tow guide channel 358 under the control of the feed roller 382, at the desired speed and for the desired duration.

Figure 5B:
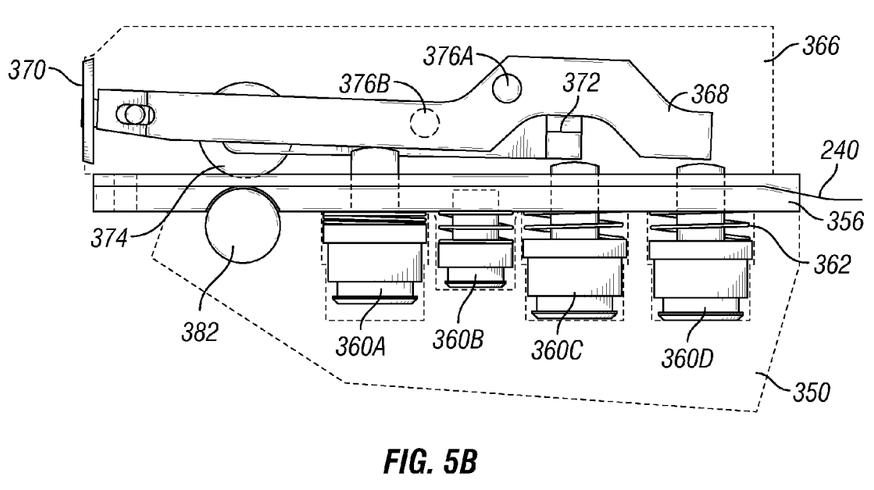

FIG. 5B illustrates the "free run" stage of the AFP process, during which a tow 240 of composite material passes through the delivery head 215 as the desired material course is placed on the substrate 210. During this free run stage, as shown in FIG. 5B, the feed piston 360C is retracted, while all the other pistons remain in the same position as during the tow feed stage shown in FIG. 5A. The retraction of the feed piston 360 causes the pinch/feed rocker 372 to pivot around the pinch/feed rocker axle 376B, lowering the back end and raising the front end of the pinch/feed rocker 372. This rotation, in turn, causes the pinch roller 374 to disengage from the feed roller 382, thereby allowing the tow 240 of composite material to pass freely through the tow guide channel 358 due to the movement of the substrate 210 and/or the delivery head 215 during the placement of the material course on the substrate 210.

Figure 5C:
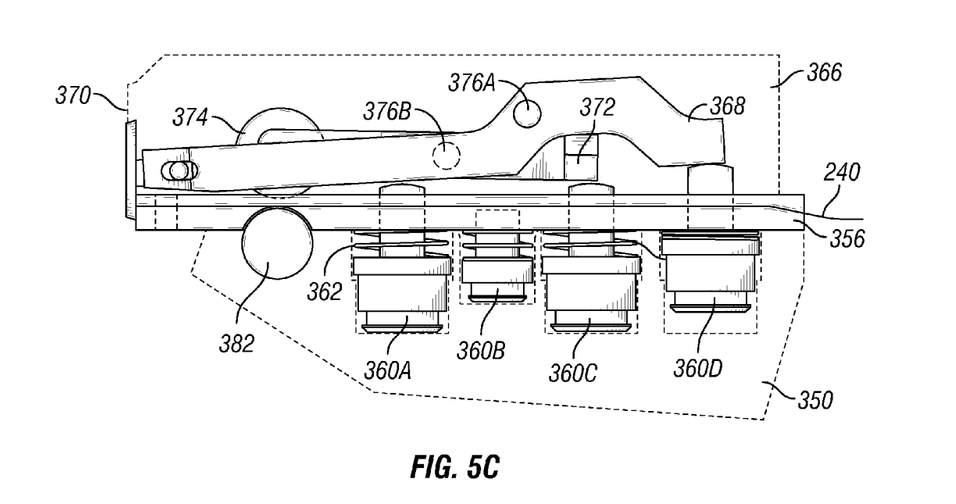

FIG. 5C illustrates the "tow cut" stage of the AFP process, during which a tow 240 of composite material is cut to a desired length by the cutter blade 370. During this tow cut stage, as shown in FIG. 5C, the cutter retract piston 360A is retracted and the cutter extend piston 360D is extended, while all the other pistons remain in the same position as during the free run stage shown in FIG. 5B. The retraction of the cutter retract piston 360A and extension of the cutter extend piston 360D cause the cutter rocker arm 368 to pivot around the cutter rocker axle 376A, thereby lowering the front end of the cutter rocker arm 368 and causing the cutter blade 370 to pass through the tow guide channel 358 and cut the tow 240 of composite material to the desired length.

Figure 5D:
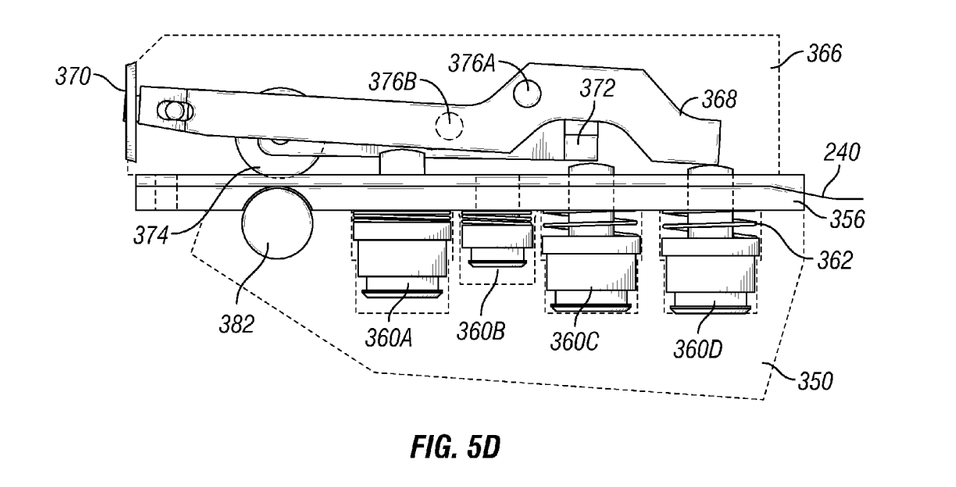

FIG. 5D illustrates the "tow clamped" stage of the AFP process, during which a tow 240 of composite material is held in place in the delivery head 215 after being cut by the cutter blade 370. During this tow clamped stage, as shown in FIG. 5D, the cutter retract piston 360A is extended and the cutter extend piston 360D is retracted to disengage the cutter blade 370. During this step, the circular cutter blade 370 may rotate due to vibrations or other forces, thus advantageously providing a new cutting edge on the same cutter blade 370 for the next tow cut. At substantially the same time, the clamp piston 360B is extended to exert a force on the tow 240 and hold it stationary in the tow guide channel 358. Without this clamping step, the tow 240 may have a tendency to recoil after being cut due to the tension caused by the remaining length of tow material stored on the corresponding storage spool 225. By holding the tow 240 stationary, however, the AFP machine 200 can accurately determine the location of the end of the tow 240, and can thus accurately position the delivery head 215 for placement of the subsequent course of composite material on the substrate 210.

In conventional AFP machines, the cutter blade is normally actuated by a single, dual-acting air cylinder, i.e., a single air cylinder that "pushes" the cutter blade to engage the cutter and "pulls" the cutter blade to disengage the cutter. In the AFP machine 200 of the present application, by contrast, the advance and retract functions of the cutter blade 370 are separated into two pistons (e.g., the cutter retract piston 360A and the cutter extend piston 360D). This configuration advantageously eliminates the need for at least one rod seal and simplifies the mechanism by using only pushrods with no "pull" requirement.

As a result of the features described above, the AFP machine 200 of the present application advantageously has a minimum cut length that is substantially shorter than the minimum cut length of a conventional AFP machine. For example, in some cases, the AFP machine 200 of the present application can cut tows 240 of composite material to lengths as short as about 1½ inches. As a result, the AFP machine 200 of the present application advantageously allows economical application of the AFP process to small composite parts, especially flat or nearly-flat charges. This may include certain composite parts (e.g., spars, etc.) in which an area being compacted by the AFP machine 200 is flat or nearly-flat locally, while the composite part(s) may have curved portions, e.g., a tight convex curvature at a radius from a web to a flange.

Figure 6:
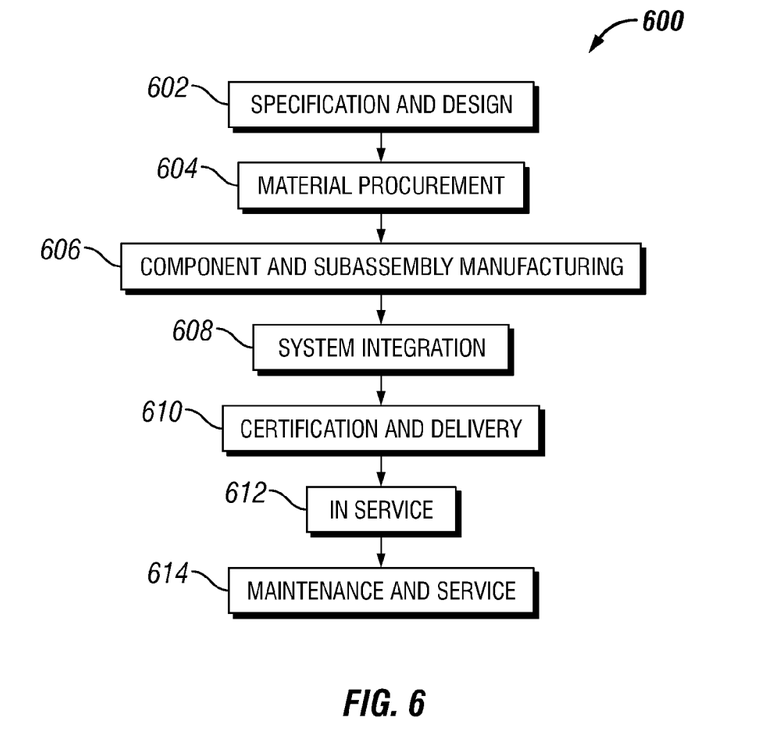
FIG. 6 is an illustration of a flow diagram of aircraft production and service methodology.
Figure 7:
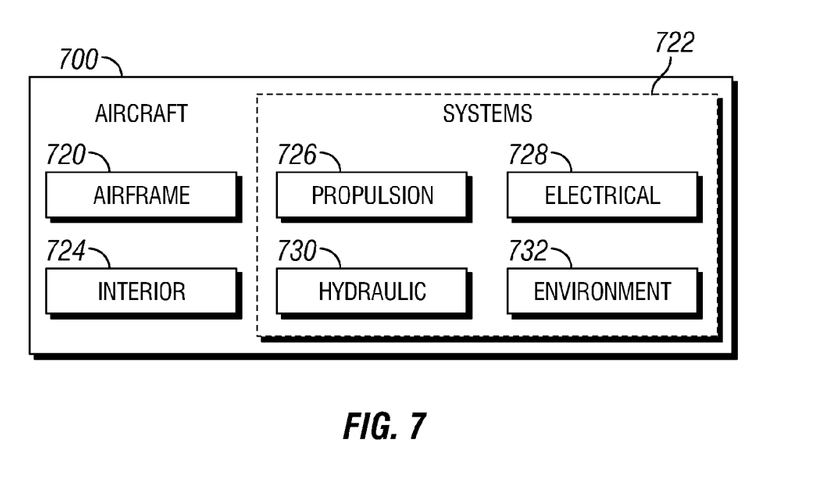
FIG. 7 is an illustration of a block diagram of an aircraft.

Referring to FIGS. 6-7, the systems and methods of the present application may be implemented in the context of an aircraft manufacturing and service method 600 as shown in FIG. 6 and an aircraft 700 as shown in FIG. 7. During pre-production, exemplary method 600 may include specification and design 602 of the aircraft 700 and material procurement 604. During production, component and subassembly manufacturing 606 and system integration 608 of the aircraft 700 takes place. Thereafter, the aircraft 700 may go through certification and delivery 610 in order to be placed in service 612. While in service 612 by a customer, the aircraft 700 is scheduled for routine maintenance and service 614 (which may also include modification, reconfiguration, refurbishment, and so on).

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 700 produced by exemplary method 600 may include an airframe 720 with a plurality of systems 722 and an interior 724. Examples of high-level systems 722 include one or more of a propulsion system 726, an electrical system 728, a hydraulic system 726, and an environmental system 728. Any number of other systems may be included. Although an aerospace example is shown, the principles of the disclosed embodiments may be applied to other industries, such as the automotive industry.

Apparatus and methods embodied herein may be employed during any one or more of the stages of the production and service method 600. For example, components or subassemblies corresponding to production process 606 may be fabricated or manufactured in a manner similar to components or subassemblies produced while the aircraft 700 is in service 612. Also, one or more apparatus embodiments, method embodiments, or a combination thereof may be utilized during the production stages 606 and 608, for example, by substantially expediting assembly of or reducing the cost of an aircraft 700. Similarly, one or more of apparatus embodiments, method embodiments, or a combination thereof may be utilized while the aircraft 700 is in service 612, for example and without limitation, to maintenance and service 614.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

What is claimed is:

1. An automated fiber placement (AFP) machine for placing composite material on a substrate, the AFP machine comprising:
    a first low-profile tow control module comprising one or more circular cutter blades;
    a second low-profile tow control module comprising one or more circular cutter blades;
    a vee block coupled to the first and second low-profile tow control modules and located between the first and second low-profile tow control modules, the vee block comprising a solid component with cavities and a plurality of air passages located therein for pneumatic control of the first and second tow control modules; and
    a plurality of air cylinders coupled to the vee block and nested between the first low-profile tow control module and the second low-profile tow control module, the plurality of air cylinders being aligned with the air passages located within the vee block.

2. The AFP machine of claim 1, wherein the first and second low-profile tow control modules have a height no greater than about ¾ inch.

3. The AFP machine of claim 1, wherein the circular cutter blades have a height no greater than about ¾ inch.

4. The AFP machine of claim 1, further comprising a compaction roller having a diameter no greater than about ¾ inch.

5. The AFP machine of claim 1, wherein the circular cutter blades are removably coupled to a cutter rocker arm configured to be rotated about an axle by a first, cutter extend piston and second, cutter retract piston.

6. The AFP machine of claim 1, wherein the substrate comprises a flat or nearly-flat charge.

7. The AFP machine of claim 1, further comprising a control unit configured to access a file that includes computer readable instructions for fabricating a composite item.

8. The AFP machine of claim 1, further comprising one or more positioning devices configured to maneuver the substrate relative to a delivery head while the composite material is placed on the substrate.

9. The AFP machine of claim 8, wherein the positioning device(s) comprise one or more NC machines, robotic arms, or mandrels.

10. An automated fiber placement (AFP) machine comprising:
    a first low-profile tow control module comprising one or more cutter blades;
    a second low-profile tow control module comprising one or more cutter blades;
    a vee block coupled to the first and second low-profile tow control modules and located between the first and second low-profile tow control modules, the vee block comprising a plurality of cavities and a plurality of air passages located through the vee block, wherein each cavity of the plurality of cavities is in communication with an air passage of the plurality of air passages through the vee block for the pneumatic control of the first and second tow control modules; and
    a plurality of air cylinders positioned within the plurality of cavities of the vee block and nested between the first low-profile tow control module and the second low-profile tow control module, each of the plurality of air cylinders being coupled with an air passage of the plurality of air passages located through the vee block.

11. The AFP machine of claim 10, wherein the first and second low-profile tow control modules have a height no greater than about ¾ inch.

12. The AFP machine of claim 10, wherein the cutter blades are circular and have a height no greater than about ¾ inch.

13. The AFP machine of claim 10, further comprising a compaction roller having a diameter no greater than about ¾ inch.

14. The AFP machine of claim 10, wherein the plurality of air cylinders further comprises at least a first, cutter extend piston and a second, cutter retract piston.

15. The AFP machine of claim 14, wherein the cutter blades are circular and are removably coupled to a cutter rocker arm configured to be rotated about an axle by the first, cutter extend piston and the second, cutter retract piston.

16. The AFP machine of claim 10, wherein the AFP machine is for placing composite material on a substrate.

17. The AFP machine of claim 16, wherein the substrate comprises a flat or nearly-flat charge.

18. The AFP machine of claim 16, further comprising one or more positioning devices configured to maneuver the substrate relative to a delivery head while the composite material is placed on the substrate.

19. The AFP machine of claim 10, further comprising a control unit configured to access a file that includes computer readable instructions for fabricating a composite item.

20. An automated fiber placement (AFP) machine comprising:
    a first low-profile tow control module comprising one or more cutter blades;
    a second low-profile tow control module comprising one or more cutter blades;
    a vee block coupled to the first and second low-profile tow control modules and located between the first and second low-profile tow control modules, the vee block comprising a solid component with cavities and a plurality of air passages through the vee block for the pneumatic control of the first and second tow control modules; and
    a plurality of air cylinders coupled to the vee block and nested between the first low-profile tow control module and the second low-profile tow control module, the plurality of air cylinders being aligned with the air passages located through the vee block, wherein the cutter blades are removably coupled to a cutter rocker arm to be rotated about an axle by a cutter extend piston and a cutter retract piston.

* * * * *